United States Patent [19]

Boes

[11] 4,275,891
[45] Jun. 30, 1981

[54] FACE TYPE SHAFT SEAL FOR LIQUID METAL PUMPS

[75] Inventor: David J. Boes, Monroeville, Pa.
[73] Assignee: Westinghouse Electric Corp., Pittsburgh, Pa.
[21] Appl. No.: 66,370
[22] Filed: Aug. 14, 1979
[51] Int. Cl.³ .................. F16J 15/34; F16J 15/40
[52] U.S. Cl. .................. 277/96.1; 277/96.2; 277/134; 277/135
[58] Field of Search ............... 277/13, 14 R, 14 V, 277/81 R, 3, 27, 93 R, 93 SD, 96 R, 96.1, 96.2, 133–135, 226, 236

[56] References Cited

U.S. PATENT DOCUMENTS

| | | | |
|---|---|---|---|
| 2,949,321 | 8/1960 | Tracy | 277/96 X |
| 3,502,342 | 3/1970 | Albert | 277/17 |
| 3,638,957 | 2/1972 | Marsi | 277/96.1 |
| 3,675,935 | 7/1972 | Ludwig et al. | 277/27 |
| 3,894,741 | 7/1975 | McHugh | 277/96.1 X |
| 3,973,781 | 8/1976 | Grorich | 277/134 |
| 4,007,940 | 2/1977 | Chapa | 277/93 R X |

FOREIGN PATENT DOCUMENTS 919210  1/1973  Canada .
1009940 11/1965  United Kingdom .

OTHER PUBLICATIONS

"Metal V-Seals Mark II", Parker Seal Company, Culver City, Calif., Booklet issued Mar. 1969, Booklet No. V5870, p. 5.

Primary Examiner—Robert S. Ward, Jr.
Attorney, Agent, or Firm—L. A. DePaul; Z. L. Dermer

[57] ABSTRACT

A face type shaft seal for liquid metal pumps comprises a non-contacting seal in which at least one seal face has spiral grooves therein. The seal faces are gold plated and designed so that the liquid metal wets the seal faces and creates a thin layer of liquid metal between the two seal faces during both rotation of the pump shaft and non-rotation of the pump shaft. The thin layer of liquid metal prevents contact of the two seal faces during initial rotation of the pump shaft.

7 Claims, 3 Drawing Figures

FACE TYPE SHAFT SEAL FOR LIQUID METAL PUMPS

BACKGROUND OF THE INVENTION

This invention relates to face type shaft seals and more particularly to face type shaft seals for liquid metal pumps.

Typically primary coolant pumps used in large commercial nuclear power plants have controlled leakage face type seals to retain and confine the radioactive fluid within the pressure containment boundary of the pump. These seals are constructed to operate at moderately high system pressure. This system pressure is therefore utilized as the prime parameter to ensure operational reliability under normal conditions. However, these seals are also required to operate reliably for short periods of time at system pressure conditions far below the normal operating pressure. Prior controlled leakage face type seals are particularly sensitive in this region and are subject to rubbing at low pressure if thermal and/or pressure excursions are experienced.

The face type shaft seal must be capable of operating under normal operating conditions and also at start-up conditions. During normal operating conditions, a liquid film is generally developed between the two seal faces so as to prevent metal-to-metal contact of the two seal faces. However, during initial rotation of the pump shaft, there is generally an insufficient liquid film between the two faces so that a small amount of metal-to-metal rubbing may occur. This is generally not a serious problem because in most seals the metal is of a type that is capable of withstanding slight contact for a minimal amount of time.

In liquid metal pumps developed to date the pump has employed a shaft seal utilizing oil to maintain separation between the two seal faces. In the liquid metal pumps, since the alkali metal coolant being pumped is at a temperature of approximately 400° to 500° C., the pump shaft length must be increased so that the seal can be located a sufficient distance from the heat source so that the seal may be operated without deteriorating due to the extreme temperature of the alkali metal coolant. For example, a typical liquid metal pump shaft is generally more than twice the length of the pump shaft in a typical pressurized water reactor coolant pump. Of course, the increased pump shaft length results in a substantial increase in capital cost for the pump.

In analyzing the liquid metal fast breeder reactor, it becomes apparent that the gas-buffered, oil-lubricated seals of the coolant pump should be replaced by a pump shaft seal capable of operating near the liquid metal coolant. Such a pump shaft seal may be one in which the liquid metal coolant for the nuclear reactor is used as the liquid film between the two faces of the shaft seal. By using such a design, it is possible to greatly reduce the length of the pump shaft and thereby greatly reduce the capital cost of the liquid metal pump. A basic requirement of this type seal, however, is that it be a non-contacting type. This requirement is based on two facts. First, because of compatibility considerations with hot alkali metal, conventional said materials, such as carbon-graphite cannot be considered. As a result, both faces of the seal package must be manufactured from alkali metal compatible metals or ceramics, such as Stellite, carbides, or alumina. None of these materials have self-lubricating, properties, thus introducing a high degree of probability of severe scoring upon initiation of rotation of a contact-type face seal. Secondly, the fluid being sealed, such as sodium, has little if any lubricating ability and is an excellent reducing agent. By the removal of the beneficial boundary lubricant oxide layers, some of the proposed seal materials may quickly possess extremely clean metal surfaces with high self-welding tendencies.

Therefore, what is needed is a face type shaft seal that is capable of being operated in a liquid metal environment.

SUMMARY OF THE INVENTION

A face type shaft seal for liquid metal pumps comprises a non-contacting seal in which at least one seal face has spiral grooves therein. Both seal faces are gold plated which ensures complete wetting of the seal faces with the liquid metal coolant which thereby establishes a thin liquid metal film between the two seal faces thus preventing contact of the two seal faces. Upon shaft rotation, a pumping action of the spiral grooves is initiated, displacing the liquid metal toward the seal dam thus pressure-loading the seal. Therefore, no contact between the seal faces occurs before or during shaft rotation and the pumping action provides a driving force preventing fluid leakage.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

In order to reduce the pump shaft length in a liquid metal pump, it is necessary to employ a liquid metal seal capable of operating in a liquid metal environment. The liquid metal seal must be non-contacting both when the pump shaft is not rotating and when the pump shaft is rotating. The invention described herein is a face type shaft seal for a liquid metal pump wherein the two faces of the seal are non-contacting when both the pump shaft is not rotating and when the pump shaft is rotating.

Figure 1:
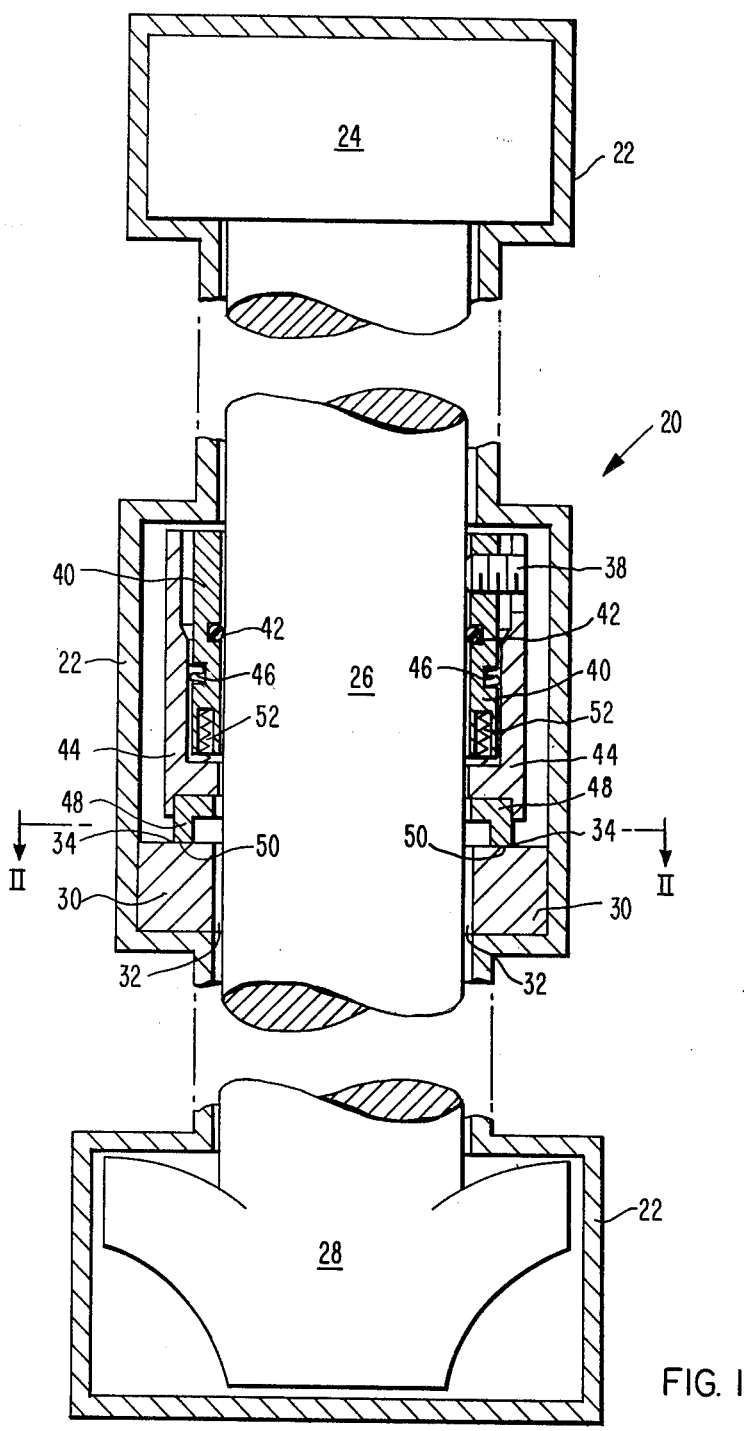
FIG. 1 is a partial cross-sectional view in elevation of a liquid metal pump.

Referring to FIG. 1, the liquid metal pump is referred to generally as 20 and comprises a housing 22 which encloses a motor 24, pump shaft 26, and pump impeller 28. Motor 24 is connected to pump impeller 28 by means of pump shaft 26 as is commonly understood in the art. The action of motor 24 causes pump shaft 26 to rotate thereby rotating pump impeller 28. The rotation of pump impeller 28 causes liquid metal to be pumped through the nuclear reactor primary coolant system. A seal ring 30 is attached to housing 22 and surrounds pump shaft 26 thereby defining a first annulus 32 therebetween. First annulus 32 allows pump shaft 26 to rotate without contacting seal ring 30. Seal ring 30 has a first seal face 34 on the top thereof. A seal assembly 36 is attached to pump shaft 26 by means of a locking screw 38 and comprises a first member 40 that is a substantially cylindrical member disposed around pump shaft 26. A first contacting seal 42 which may be a metal O-ring is disposed in first member 40 and in contact with pump shaft 26 to prevent leakage therebetween. A second member 44 which may be substantially cylindrical is disposed around first member 40 in a sliding relationship. A second contacting seal 46 which may be a metal bellows type seal is disposed in first member 40 and in contact with second member 44 to seal the annulus between first member 40 and second member 44 while allowing second member 44 to slide vertically relative to first member 40. Second member 44 also has a slot near the top end thereof that allows second member 44 to slide relative to first member 40 without interfering with locking screw 38. A seal runner 48 is attached to the lower end of second member 44 so as to face seal ring 30. Seal runner 48 has a second seal face 50 that is arranged to confront first seal face 34. A biasing mechanism 52 which may be a single spring or a series of springs is disposed in first member 40 and extends into contact with second member 44 for urging first member 44 toward seal ring 30. The action of biasing mechanism 52 serves to urge second seal face 50 toward first seal face 34.

Figure 2:
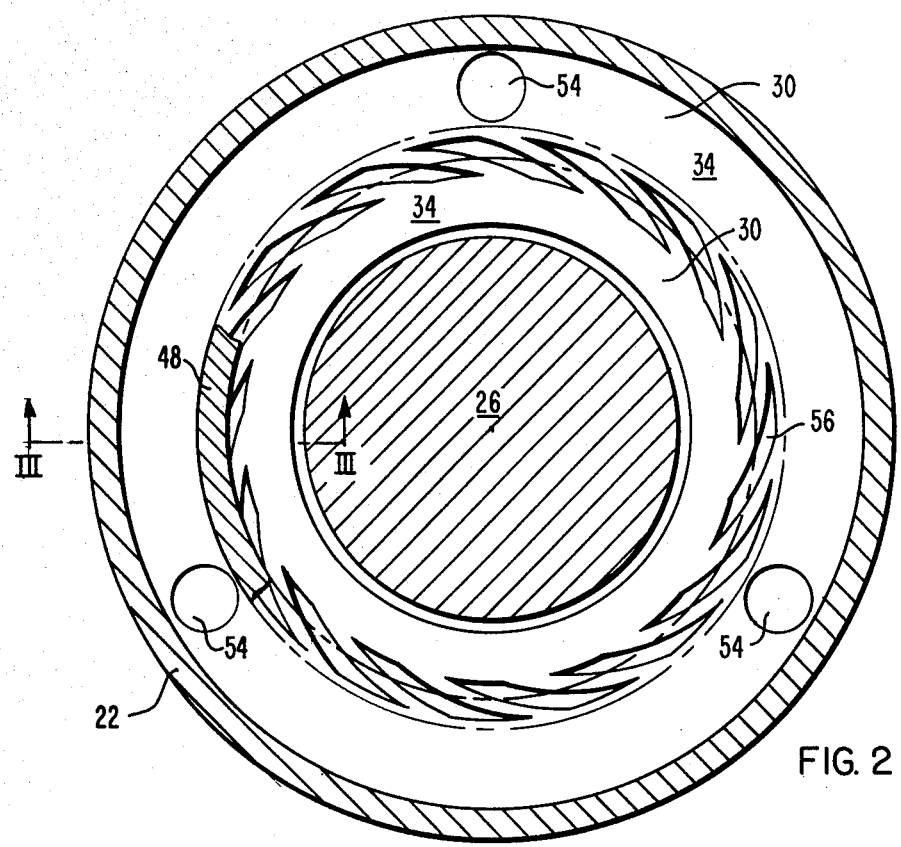
FIG. 2 is a view along lines II—II of FIG. 1.
Figure 3:
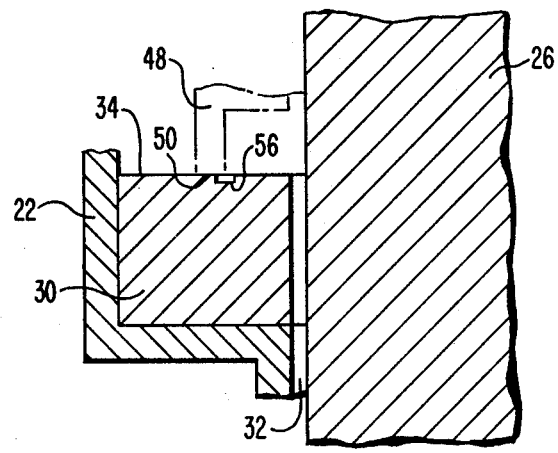
FIG. 3 is a detail drawing of the seal faces in FIG. 1.

Referring now to FIGS. 2 and 3, seal ring 30 is bolted to housing 22 by means of bolts 54. A series of spriral grooves 56 are etched in first seal face 34. Of course, the spiral grooves in the alternative may be etched in second seal face 50. Spiral grooves 56 are etched to have a depth of approximately 0.0005 to 0.0015 inches. Both first seal face 34 and second seal face 50 are electroplated with a thin film of gold which may have a thickness of approximately 0.0001-0.0005 inches. Seal runner 48 is arranged as shown in FIG. 3 so that spiral grooves 56 extend beyond the inside diameter of seal runner 48 and terminate short of the outside diameter thereof. By having spiral grooves 56 extend beyond the inside diameter of seal runner 48, liquid metal is allowed to fill spiral grooves 56 and create a thin film of liquid metal between first seal face 34 and second seal face 50 thereby preventing metal-to-metal contact of first seal face 34 and second seal face 50. The liquid metal to be sealed may be chosen from those liquid metal coolants well known in the art such as sodium or a sodium-potassium mixture.

The key to achieving a successfully operating metal-to-metal seal combination operable in an alkali metal environment lies in ensuring that both seal surfaces are totally wetted by the sealed medium before operation is initiated. The surface phenomenon of a liquid, known as wetting, refers to the situation wherein the adhesive force between the molecules of the liquid metal of the seal and the molecules of the material of the seal faces is greater than the cohesive force between the molecules of liquid metal. In this case, wetting of the seal surfaces results in a thin film of liquid metal being established between first seal face 34 and second seal face 50 thereby preventing metal-to-metal contact of the seal faces. Wetting is accomplished in this manner by the thin film of gold that is electroplated to the seal faces. In this way, a thin film of alkali metal is tenaciously held to the seal surfaces and prevented from being totally forced from between the surfaces. In addition, liquid metal remains in the bottom of each spiral groove 56. During assembly the components are brought into abutting relationship and a closure force is exerted that is sufficient to contain a liquid metal at initial start-up pressure. The seal surfaces are then initially wetted with liquid metal. Once motor 24 has been activated, the rotation of pump shaft 26 and pump impeller 28 causes liquid metal to be forced through first annulus 32 and between first seal face 34 and second seal face 50. However, the rotation of seal runner 48 relative to seal ring 30 together with the action of spiral grooves 56 creates a pumping action which forces the liquid metal back toward first annulus 32 thus limiting the leakage between first seal face 34 and second seal face 50. The spiral groove-type seal combines hydrostatic and hydrodynamic features to provide a non-contacting, low-leakage face seal. Investigators have postulated that the hydrodynamic forces arise from a slider-bearing effect of the spiral grooves land area and from the pressure patterns developed by the spiral grooves. Thus, no contact between the seal faces occurs during shaft rotation, and the pumping action provides a driving force preventing fluid leakage. Furthermore, the initial establishment of the thin film of liquid metal between the seal faces caused by the wetting action of the gold-plated surfaces ensures that there is no metal-to-metal contact at initiation of rotation of the seal surfaces. Therefore, it can be seen that the invention provides a face type shaft seal for a liquid metal pump wherein the seal faces are non-contacting both at start-up and during operation of the pump.

I claim as my invention:

1. A liquid metal pump comprising:
   a housing;
   a motor enclosed within said housing;
   a pump shaft connected at one end to said motor;
   an impeller connected to the other end of said pump shaft for circulating a liquid metal under the action of said motor;
   a seal assembly mounted on said pump shaft;
   a seal ring having a first seal face with a layer of gold plated thereon and having spiral grooves therein, said seal ring being mounted in said housing and disposed around said pump shaft defining an annulus between said pump shaft and said seal rings; and
   a seal runner having a second seal face with a layer of gold plated thereon and attached to said seal assembly, said liquid metal being forced through said annulus under the action of said pump and wetting said seal faces thereby preventing metal-to-metal contact of said seal faces.

2. The liquid metal pump according to claim 1 wherein said spiral grooves have a depth of approximately 0.0005 to 0.0015 inches.

3. The liquid metal pump according to claim 2 wherein said layers of gold on said seal faces have a thickness of approximately 0.0001-0.0005 inches.

4. The liquid metal pump according to claim 3 wherein said spiral grooves extend beyond the inside diameter of said seal runner.

5. The liquid metal pump according to claim 4 wherein said spiral grooves terminate short of the outside diameter of said seal runner.

6. The liquid metal pump according to claim 5 wherein said seal assembly comprises:
   a first member disposed around said pump shaft;
   a second member slidably disposed around said first member; and
   biasing means disposed in said first member and extending into contact with said second member for urging said second member toward said seal ring.

7. The liquid metal pump according to claim 6 wherein said seal runner is attached to said second member so that said second seal face confronts said first seal face.

* * * * *